United States Patent [19]

Hakamada

[11] Patent Number: 4,931,829
[45] Date of Patent: Jun. 5, 1990

[54] TRIMMING DEVICE FOR USE WITH PHOTOGRAPHIC PAPER PRINTER

[75] Inventor: Haruo Hakamada, Hino, Japan
[73] Assignee: Konica Corporation, Tokyo, Japan
[21] Appl. No.: 344,102
[22] Filed: Apr. 26, 1989
[30] Foreign Application Priority Data
  Apr. 27, 1988 [JP] Japan ................. 63-104937
[51] Int. Cl.⁵ ............................ G03B 27/53
[52] U.S. Cl. ......................... 355/68; 355/74
[58] Field of Search .............. 355/40, 64, 68, 74, 355/77

[56] References Cited
U.S. PATENT DOCUMENTS
4,417,810 11/1983 Ueda et al. .................. 355/74
4,727,399 2/1988 Matsumoto ................ 355/41

Primary Examiner—L. T. Hix
Assistant Examiner—D. Rutledge
Attorney, Agent, or Firm—Jordan B. Bierman

[57] ABSTRACT

Disclosed is a trimming device for use with a photographic printer having a fixed window mask unchangeable in size and a variable window mask having a movable window frame for changing a window size. Each window of the fixed window mask and the variable window mask is shaped symmetrically in the optical axis of exposure light so that exposure light is projected through smaller window among the fixed window mask and the variable window mask. There is provided a film guide plate for guiding a film frame to be printed into exposure light. The film guide plate is adapted to allow a film frame to move in X and Y directions, and the movable window frame is also adapted to change a window size in the both X and Y direction, Symmetrically in the optical axis of exposure light.

11 Claims, 9 Drawing Sheets

TRIMMING DEVICE FOR USE WITH PHOTOGRAPHIC PAPER PRINTER

BACKGROUND OF THE INVENTION

This is a trimming device mostly used in combination with an E-size high-speed color printer, which was developed to allow speedy and efficient negative-film-based printing procedures for trimming enlargement orders.

When meeting orders for color print enlargement with an instruction for trimming by a customer, designation of only a specific area of a frame, usually negative film, for enlargement, color labs have been accepting it for the sizes larger than E-size (E-size 82×117 mm, L size 89×127 mm, or similar sizes) because it has been extremely difficult to achieve this trimming enlargement for the said E-size with an existing high-speed color printer.

As the primary condition, a printer capable of trimming enlargement must be equipped with a continuous variable magnification device. The second condition is that the printer be devised so that the operator can visually check the trimming area of the original film frame.

Accordingly, a photographic printer with variable magnification ability is provided with a viewer used for trimming confirmation.

In terms of the structure of this kind of viewer, two representative examples of the printer models with current viewer facility in practical use are shown in FIGS. 10 and 11.

FIG. 10 illustrates an existing printer pivoting around its optical system. Its configuration includes a negative carrier 40A to hold the negative frame usually, but sometimes transparency for positive-to-positive print, an illuminator unit 90A consisting of a lamp 91 to illuminate the negative and a condenser lens 92, a projection lens 50A to blow up the negative frame so that an enlarged image is formed on the print image plane 73, and an exposure shutter 62; the latter two, 50A and 62 are contained in a leakage-free housing together with the aforementioned 40A, which are designed so that the light from the illuminator unit 90 doesn't reach the print image plane for exposure and no light leakage is caused, except that the shutter 62 opens.

When it is necessary to check the print area of a frame as the trimming process by moving the negative on the negative carrier 40A to a desired position, the operator can relocate the mirror 74 from A to B to confirm the projected image on the viewer screen 76 by opening the said exposure shutter 62 and the screen shutter 77 located near the viewer screen 76; this is for completely shielding the projection light from being delivered to the photo sensitized material, viz., print paper, on the print image plane. Through this viewer monitoring, the operator is also allowed to further shift the position of the negative on the carrier or to change the magnification, so that he can obtain a trimming image of a desired size.

The indicator markings corresponding to the masking frame on the image-forming plane, are found on the screen. Thus, the operator can observe with his eyes which portion of the negative frame is projected within the mask.

After completion of viewer checking, the exposure shutter and the screen shutter are closed, and the mirror 74 is returned from B to A position. Now the preparations before exposure are complete.

Next an explanation on the model indicated in FIG. 11 is given below. This printer allows a more direct viewing from the print image forming plane. In its construction, a print plane shutter 81 is provided on the negative side of the print image plane, and while the said shutter 81 is closed, the negative frame specified for trimming is projected on the rear surface of the shutter within the area corresponding to the masking frame indicated on the screen (rear side). Now the operator can view the projected image, directly or through a separate viewer screen 76; in the latter case, a secondary projection method is employed, that is, the image projected on the shutter is reflected for secondary reflection on the mirror 79, and then transmitted to the viewer screen.

When confirming the projected image through this type of viewer shown in FIG. 11, first close the print plane shutter 81, and open the exposure shutter 62 and the viewer shutter 77A. Then the image projected on the print plane shutter 81 can be monitored. After the use of the viewer, close the viewer shutter 77A and the exposure shutter, and then open the print plane shutter 81 to make the print paper ready for exposure. As compared to the model indicated in FIG. 10, this printer doesn't need mirror rotation, but has an increased number of shutters.

Further, of late, a model is also available that catches the projected image with a CCD camera, in place of the conventional optical viewer, to display it on a monitor screen. In this case, the image projected on the viewer screen as in FIG. 10, or the projected image on the print plane shutter as in FIG. 11, is monitored through the lens of the CCD camera. With this new type of printer, as the operator is not required to confirm the projected image from the outside of the machine, neither a screen unit (FIG. 10 case) nor a direct-view window (FIG. 11 case) are necessary, further, there is no need of such aids as a screen shutter or a viewer shutter.

However, ON/OFF control of the exposure shutter, control of the mirror rotation, ON/OFF control of the screen shutter, etc. are required.

In any one of those cases of the existing printers, it is necessary to check in advance the state of trimming of the negative frame with the aid of a viewer function, simultaneously requiring a dedicated mechanism and relevant controls. This has been lowering the printing efficiency to a marked degree.

Particularly, the print plane shutter, rotary mirror, screen shutter, viewer shutter, etc. cannot avoid being designed extremely large in size, further, it additionally takes several seconds to complete the operation of each device. Accordingly this leads to the need of several tens of seconds or several minutes if all the other trimming processes are included.

Under this situation, a trimming job has so far been undertaken only in the case of orders mainly for specific large-size print production. If this trimming is applied to E-size print, especially re-order printing of E-size, called the NP print, it would necessitate considerable time and labor, which at present hinders its actual application.

SUMMARY OF THE INVENTION

The aim of the present invention is to offer a trimming device for use with a photographic printer by means of a drastic improvement of the trimming function, so that the printer is newly equipped with a trimming performance capable of speedy and accurate operation for E-size prints including the NP print.

This purpose is accomplished by a trimming device for use with a photographic printer that features: a fixed negative mask window (mask size not changeable) and a variable negative mask window, designed variable in the size of mask, which are symmetrically provided in the optical axis of exposure. The trimming operation is done while visually confirming the are of the negative frame to be printed, by sliding the negative film in the direction of the width (Y direction) and in the direction vertical to it (X direction) in order to adjust the trimming center to the said optical axis, and then by changing the size of the variable negative mask window in symmetry with the said optical axis and in the X and Y directions.

This method aims to eliminate various operations required during viewer manipulation in order to achieve better trimming efficiency, by means of making the negative carrier unit, that is, the negative film holder unit, possess the function corresponding to a conventional trimming viewer.

DETAILED DESCRIPTION OF THE INVENTION

Figure 1:
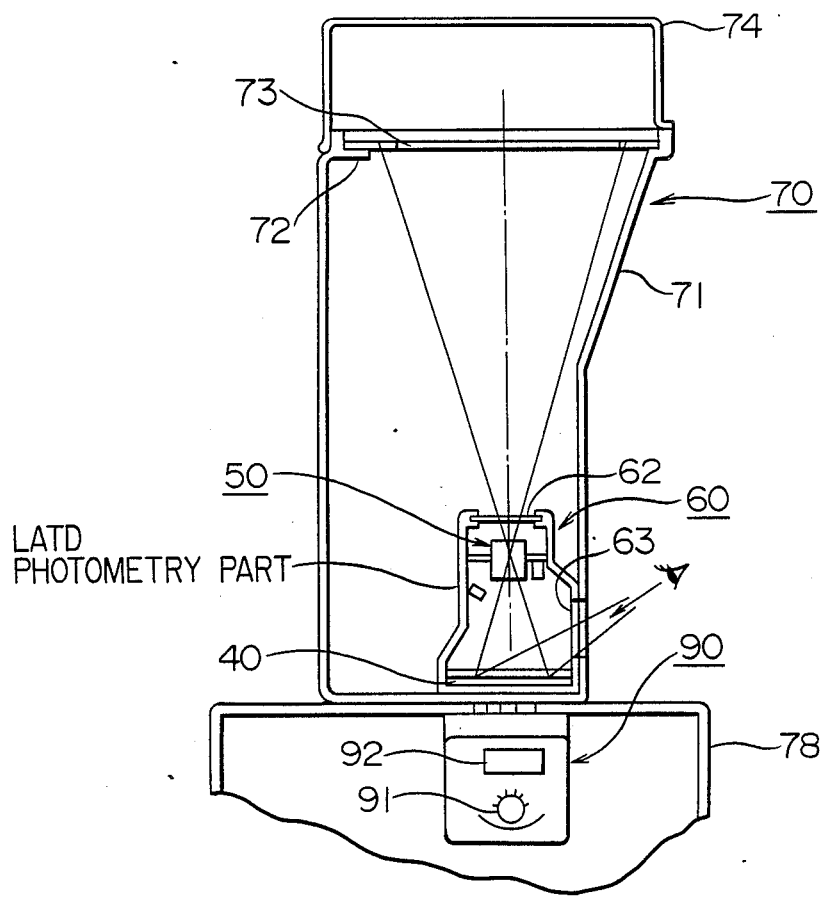
FIG. 1 is a skeleton drawing of a photographic printer incorporating a trimming device covered by this invention (one practical-use version).

This invention is described below using some practical examples, but its coverage range in terms of practical application shall not be restricted to these examples.

In explaining the functions of these examples of practical application, the negative mask is represented by that for use with 135 mm full-size, but it should be regarded as a matter, of course, that negative masks of any other size can apply to these examples.

The dimensions of the 135 full-size negative mask window and representative print sizes available for an enlarged print from a 135 full-size negative, are listed in Table 1. In this description, borderless prints are taken as an example whenever the matter concerns the print size, but the same idea can apply to WB (with border) prints as well except that there is a slight difference in the size of print mask.

TABLE 1

| 135 mm negative mask window dimensions | Print size (paper mask) | Example of projection area | Magnification |
| --- | --- | --- | --- |
| 23.5 × 35.0 mm | E-size: 82 mm × 117 mm | 87 × 129.5 | 3.70 |
| | L-size: 89 × 127 mm | 94 × 140 | 4.00 |
| | 2L-size: 127 × 178 mm | 132.1 × 196.7 | 5.62 |
| | 8 × 10": 203 × 254 | 208 × 309.8 | 8.85 |
| | 10 × 2": 254 × 305 | 259 × 385.7 | 11.2 |

The above table indicates representative print sizes available from the 135 negative frame, and the projected area sizes (on print paper) and enlarging magnifications in correspondence with the print sizes.

Generally, the negative image is projected in a slightly larger size than the print size specified by the print mask (paper mask).

The size is determined so that the frame border of the enlarged image of the negative mask frame doesn't come within the paper mask, or more preferably, the length nearer to the border of the paper mask, either of the length (vertical) or width (horizontal) of the enlarged image, is defined as the paper mask border +5 mm or so. (Refer to Table 1.)

If the length-width ratio (aspect ratio) of the negative mask window coincides with that of each print size, the degree of (mechanical) vignetting due to the paper mask of the negative image is minimized for each print size, however, there is no instance of coincidence as clearly shown in the above table. Because of this dimensional difference caused by the use of each paper mask, a certain degree of vignetting takes place for all the prints processed from 135 negative film without trimming.

Accordingly, consideration must always be made on the basis of the print size dimensions.

Judging by the print sizes shown in the above table, calculations have been made in terms of the extent of the area covered in a negative frame in the case of printing without trimming. Their results are indicated in Table 2.

TABLE 2

| Print size (paper mask) | | Effective area of negative | Magnification |
| --- | --- | --- | --- |
| E-size | 82 × 117 | 22.2 × 31.6 | 3.70 |
| L-size | 89 × 127 | 22.3 × 31.8 | 4.00 |
| 2L-size | 127 × 178 | 22.6 × 31.7 | 5.62 |
| 8 × 10" | 203 × 254 | 22.9 × 28.7 | 8.85 |
| 10 × 2" | 254 × 305 | 23.0 × 27.7 | 11.02 |

In this invention, the required area of the negative frame is established by means of changing the mask dimensions on the negative frame, and it is controlled so that the said effective area of the negative frame always agrees with the image area of the said effective area of the negative frame projected on an arbitrarily specified area of the print window while employing a parameter, viz., magnification.

Figure 6:
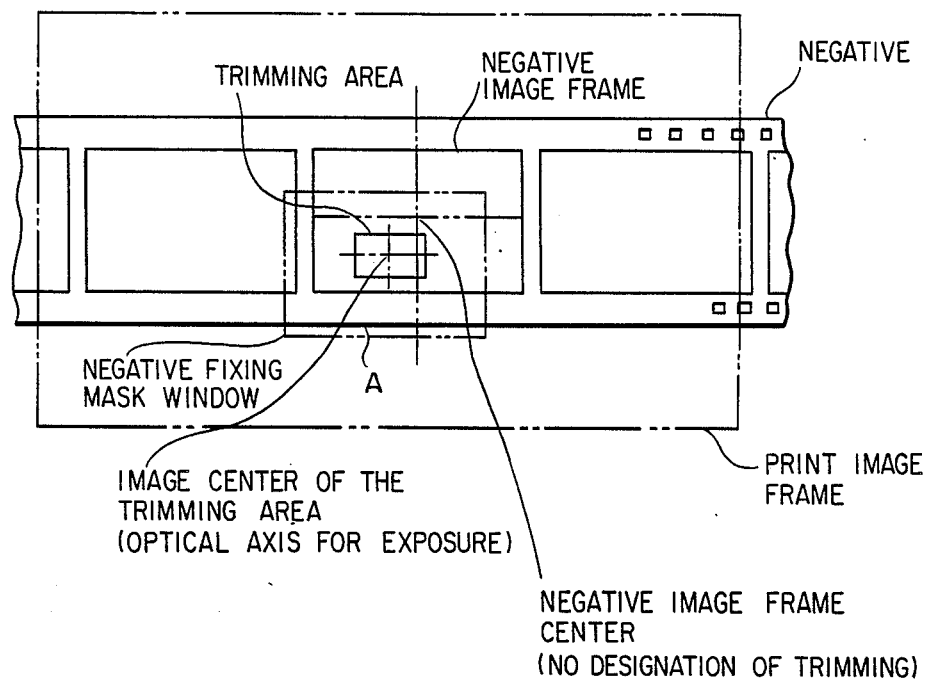
FIG. 6 is a drawing to describe the trimming area of the negative frame, and the relation in terms of location among the negative fixed mask window, print image frame and optical axis for exposure.

As shown in FIG. 6, the trimming process is completed by shifting the position of the negative in the X, Y direction on the negative base so that the center of the trimming area of negative frame becomes identical to the optical axis of exposure.

Further, the said trimming is done by moving the trimming frame piece in symmetry to the optical axis.

Of course, the trimming area is determined by the user or operator.

In place of the conventional method in which the area determination is made by observing the projected image on the viewer screen, this invention enables determining of the area while watching the negative frame illuminated with the exposure lamp and shifting the negative position and trimming area.

Explanations on an actual example of this invention thus perfected, are given below using FIGS. 1, 2 and 3.

FIG. 1 is a summary drawing of a printer incorporating one actual example of a trimming device based on this invention. This printer is equipped with the trimming device 40 on which a negative is placed for trimming, and the illuminator unit 90 which consists of the lamp 91 to illuminate the said device 40 and the condenser lens 92, further, the projection lens 50 to enlarge the negative frame to be image-formed on the print image plane 73 and the exposure shutter 62 are encased in the housing 60 together with the said trimming device 40. It is devised so that the light originating in the illumination unit 90 doesn't expose the print image plane or the light is not leaked out as far as the exposure shutter 62 is not opened. The cover structure 74 is provided over the print image plane, in which a magazine containing photo-sensitive material such as a color paper is placed, or an uncovered paper (roll) is set, so that a required area of a paper can be transported onto the print image 73.

The trimming process is done by moving the negative frame and the trimming frame on the trimming device 40 to a given location, and in the process, it is possible to easily confirm a required area of the negative frame for printing while observing its trimming area through the peep-through window 63 provided at the lower portion of the dark box 70's frame 71 and the projection lens' housing 60.

Next the said one actual example of a trimming device is further described referring to its top view (FIG. 2) and side view (FIG. 3) drawings.

The opening for negative fitting 3 is made through the trimming device 40's base 1, and the center of the opening coincides with the optical axis center of exposure. Scooped section is provided on the rear of the base 1, where the trimming frames 6, 8, 14 and 15, the rack fittings 5, 7, 11 and 12 to fix those frames, and the pinions 4 and 17 to drive the said fittings, are housed. Meanwhile, the stepping motors 9 and 18 directly linked to the said pinions are firmly set on the frame 26 which is separately provided. Lengthy openings 22 and 23 are made on each rack fitting to serve as a guide, and each rack fitting is guided along the guide pins 21 and 24 fixed on the base 1. The trimming frames 6 and 8 move in the Y direction and the trimming frames 14 and 15 are carried in the X-direction. Each set of two facing frames becomes freely movable, in symmetry to the center of the opening for negative fitting 3, by the activation of the said stepping motors.

The negative width guides 28 allow the negative, a 135 negative is given here as an example, to slide only in the X direction. As these negative width guides 28 hinder the negative moving in the Y direction, it is necessary to remove the guides 28 from the base 1 if shifting in the Y direction is required.

Figure 4:
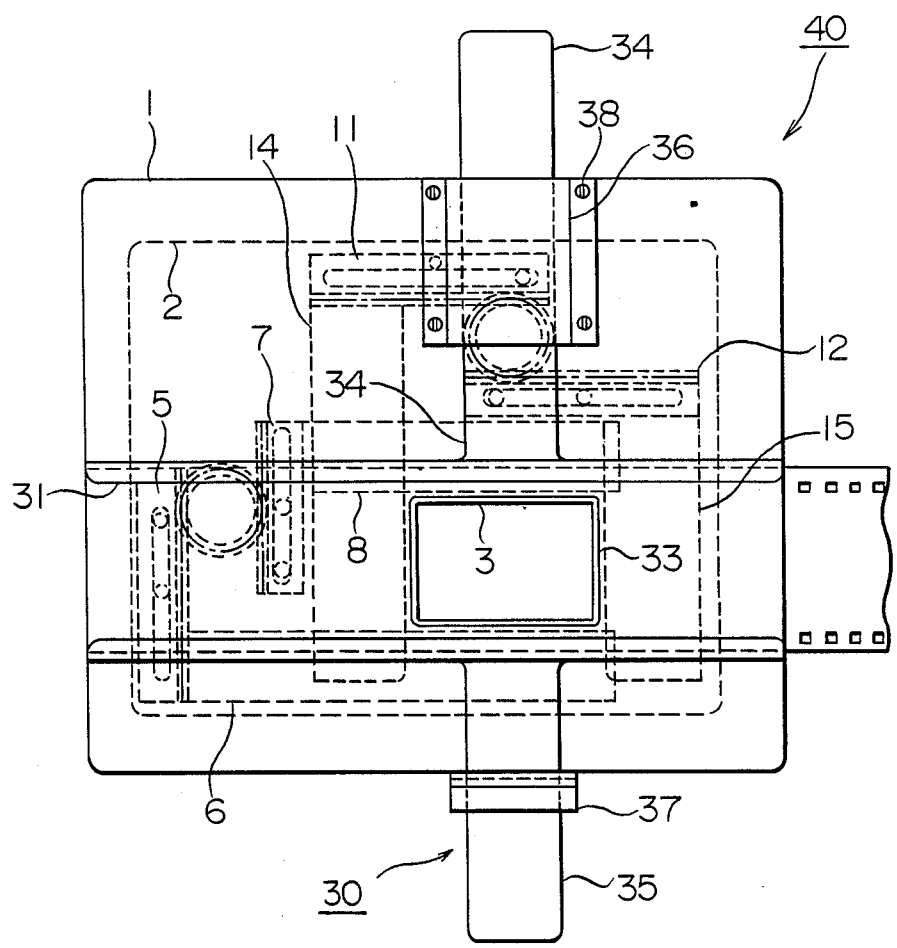
FIG. 4 is a drawing of the top view of another trimming device covered by this invention (one more example put to practical use).
Figure 5:
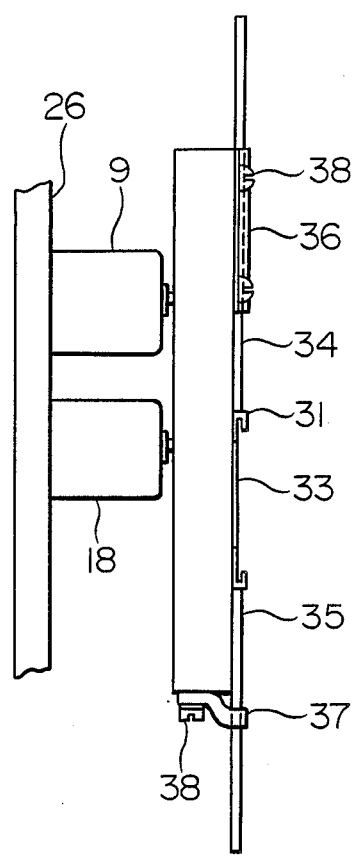
FIG. 5 (A) and (B) are side view drawings of the version shown in FIG. 4.
Figure 5:
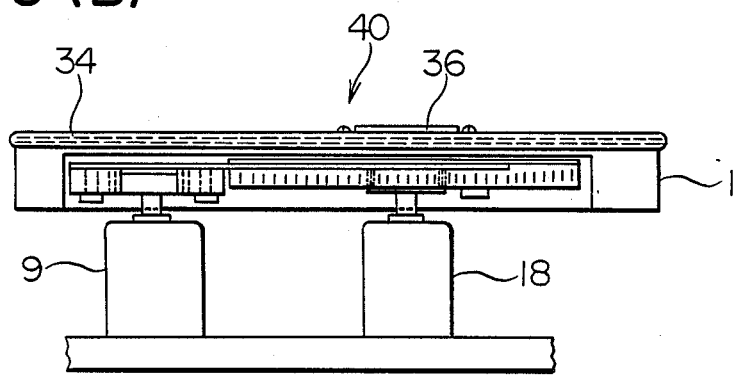

As a remedial measure, another actual example of a trimming device was perfected, as shown in FIG. 4's top view, FIGS. 5 (A) and (B)'s side views, in order to enable execution of accurate and easy trimming by means of steadily transferring the negative in both the X and Y directions. This device is explained below.

The difference from the above-mentioned actual example is a further improvement of the negative width guides 28 and the addition of the negative carrier 30.

That is, the opening for negative fitting 33 of the negative carrier 30 was made almost identical in dimensions to opening 3 on the base 1 so that the carrier 30 can freely slide in the Y direction while aligning the center line in the Y direction of the opening 33 and that of line of the opening 3.

That is, the Y direction shifting of the said carrier was made possible by making the plate 35 of the rear end section engaged with the guide 37 fixed on the base 1 and the plate 34 of front end section engaged with the guide 36 fixed on the base 1 by screw 38. Further, the negative film is placed into the guide frames 31 so that it is freely movable in the X direction.

With this device, a desired area of trimming can be checked by freely moving the negative on the center of the optical axis of exposure in both the X and Y directions. While confirming in this process, it is possible to determine the final dimensions of the area by moving the trimming frames.

The trimming frame movement of the trimming-use negative mask, with the afore-mentioned structure, is controlled as shown in Table 3.

TABLE 3

| Print size | Available range of magnification (M) | Trimming dimensions on negative surface (frame), X | Trimming dimensions on negative surface (frame), Y | Initial position of horizontal frame piece | Initial position of vertical frame piece | Negative mask opening (fixed) Dimensions |
|---|---|---|---|---|---|---|
| E-size | M ≧ 3.70 | At the time of M = 3.70, X = 31.6 | Y = 22.2 | X = 35.0 or over | Y = 23.5 or over | 35.0 × 23.5 |
|  |  | At the time of M > 3.7, X = 117/M | Y = 82/M |  |  |  |
| L-size | M ≧ 4.70 | At the time of M = 4.00, X = 31.8 | Y = 22.3 | " | " | " |
|  |  | At the time of M > 4.0, X = 127/M | Y = 89/M |  |  |  |
| 2L-size | M ≧ 5.62 | At the time of M = 5.62, X = 31.7 | Y = 22.6 | " | " | " |
|  |  | At the time of M > 5.62, X = 178/M | Y = 127/M |  |  |  |
| 8 × 10″ | M ≧ 8.85 | At the time of M = 8.85, X = 28.7 | Y = 22.9 | " | " | " |
|  |  | At the time of M > 8.85 | Y = 203/M |  |  |  |

TABLE 3-continued

| Print size | Available range of magnification (M) | Trimming dimensions on negative surface (frame), X | Trimming dimensions on negative surface (frame), Y | Initial position of horizontal frame piece | Initial position of vertical frame piece | Negative mask opening (fixed) Dimensions |
|---|---|---|---|---|---|---|
| 10 × 12" | M ≧ 11.02 | At the time of M = 11.02, X = 27.7<br>At the time of M > 11.02, X = 305/M | Y = 23.0<br><br>Y = 254/M | " | " | " |

As seen from the above table, the trimming frame denotes, for each print size, the effective print area (magnification preset) of the actual negative frame while maintaining the relationship of similarity with the length/width ratio of the print mask.

The initial position of the vertical and horizontal frames is freely selectable as far as they are larger than those of the negative mask window.

Generally, before starting actual negative exposing with a printer, the measurement of the LATD value is required. This LATD is measured in advance using so-called standard negatives obtained by the exposure that the BGR are comparatively even in color balance and reproduced in the standard density, each kind of film, each maker and each print size. The exposure conditions, control condition of out filters, the entire exposure time value and etc., determined by an exposure device at the time when each print reproduced with the said standard negative has shown the best result, is stored in memory in advance. When actually exposing the user's negative, exposure conditions are duly compensated for printing by means of reading the difference between the LATD measurement value of the user's negative and that of the above-mentioned standard negative.

In the case of printing without trimming, the exposure conditions are determined following the above cited method because the LATD measurement range with a standard negative is regarded as identical to that of the user negative. When performing print trimming with the negative carrier as per this invention, however, the movement of the trimming frame serves to change the measurement area against the LATD measurement range (window size of fixed negative mask) with a standard negative. In this case, the following is a countermeasure: LATD is measured before commencing trimming operation under the condition that the trimming frame for the negative mask is set to more than the size of the fixed mask window (initial position), and the value is registered in the memory of the printer. This makes, however, operator manipulation more cumbersome.

This is because the trimming position is, generally speaking, not always at the center of the negative, but at random.

Accordingly, it is necessary to readjust the center position of the trimming frame to that of the optical path for print while performing the trimming operation.

Firstly, the operator adjusts the negative image to the position of the fixed mask, controls the mask trimming frame to be shifted to its initial position, performs exposure operation and then readjust the trimming center to the center of the optical path and takes the final step to change the magnification so that the negative mask trimming frame is controlled to match the size of trimming.

For trimming a negative frame for an E-size print, it is ideal to eliminate such negative adjustment process for the above-mentioned LATD measurement in terms of its efficiency.

Accordingly, in place of the above-cited method, this invention offers such configuration that measurement of the negative frame can be made after completion of trimming operations, with the trimming frame remaining in the trimming position.

In this case, the measurement area changes as compared to that at the time of measuring the standard negative. As the ratio of area change has been calculated in advance on the basis of the magnification M (referred to later), the compensation condition determined by the magnification M is added to the LATD measurement value at the time of trimming, the LATD measurement value in the case without trimming is assumptively calculated, and the exposure condition is established based on the difference between the virtual value and the standard negative's LATD value.

Figure 2:
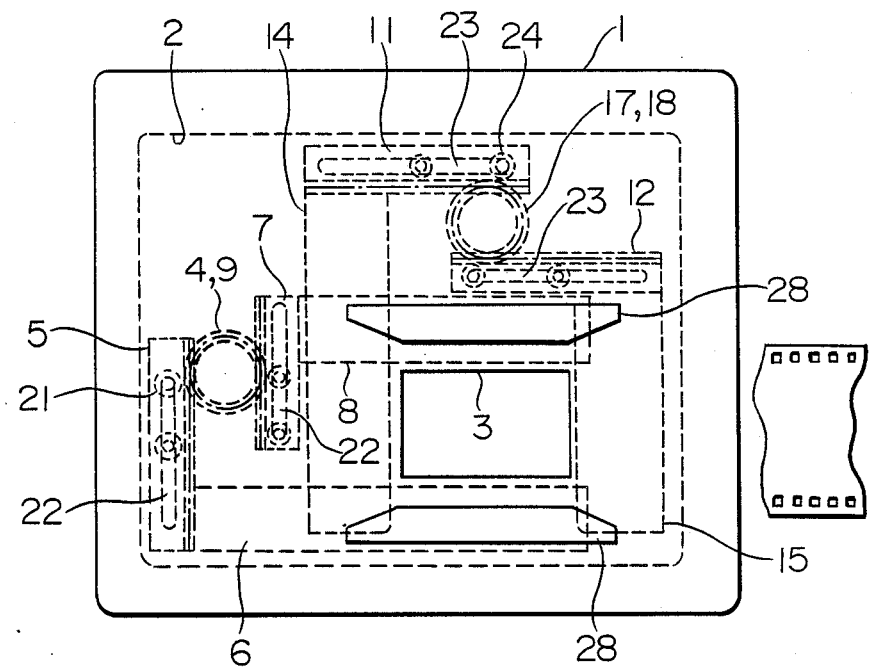
FIG. 2 is a drawing of the top view of the same trimming device.
Figure 3:
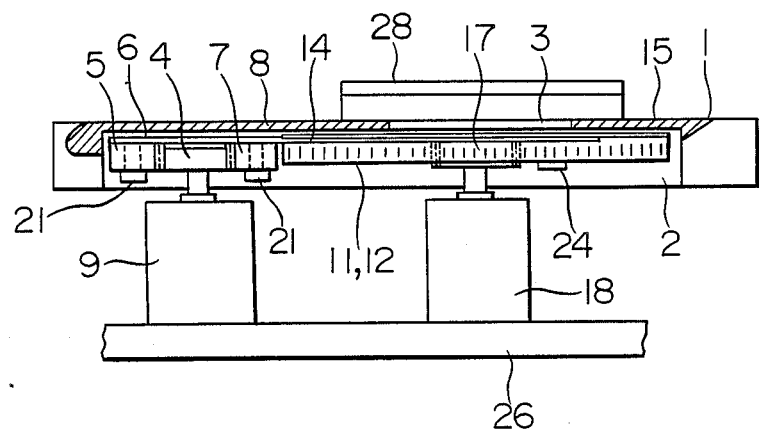
FIG. 3 is a side view drawing of the trimming device in FIG. 2.

Usages of the trimming device shown in FIGS. 2 and 3 are described below.

When printing without trimming is enforced, the trimming frame is set to the initial position to perform printing by using the fixed mask window itself.

In the case of print trimming, the negative width guides (not illustrated in the figure) are removed before the operation since they are designed to be freely removable by unscrewing the positioning pins. Their removal is needed because in order to adjust the center of the trimming frame to that of the optical axis of exposure, it is necessary to eliminate the limitation in the direction of film width which is caused by the width guides.

When adjusting the trimming center to the optical axis center, one width end A of the negative film shown in FIG. 6 comes, in some cases, inside the fixed negative mask window depending on the trimming area.

The negative pressure plate, usually having a slightly large opening than the negative mask window; this plate is not shown in FIGS. 2 and 6, is prepared against the image blurring on the finished print and to keep the negative flat.

However, when the A portion comes inside the fixed negative mask window as mentioned above, there may be a cause where sufficient flatness is unavailable at the A portion even if the negative is held with the negative pressure plate.

The trimming device shown in FIGS. 4 and 5 (A)/(B) was developed to eliminate this inconvenience. It is configured so that the fixed negative mask window is separated from the negative mask unit to be freely movable in the direction of the negative film width, the negative width guide is fixed to the negative mask window, and the negative width guide and the separated fixed negative mask window can move as they are a single unit. The concrete explanations on this device were already given in the foregoing. With this device, removal of the width guide is not required. In the case of printing without trimming, it is possible to use the negative mask window with its position adjusted to the center of the optical axis; while if trimming is required, the negative mask window can be moved one-dimensionally in order to adjust the center of trimming to the optical axis.

OPERATION AND CONTROL

The example of the trimming device based on this invention uses a zoom lens, and that is in the case of magnification change. However, the use of a vari-focal lens with variable controlling of the lens position, or the use of a fixed focus lens with the magnification by controlling the lens position and the paper mask position produce the same effect as that of the present invention.

The operator firstly confirms the trimming center of the negative frame requiring trimming, and sets the negative on the negative mask of the negative carrier as the trimming center is adjusted to the exposure center.

Next, visual checking of the trimming area is required according to the position of the trimming device's trimming frame. This method is available in three modes as indicated in FIG. 8's flow chart.

Figure 8:
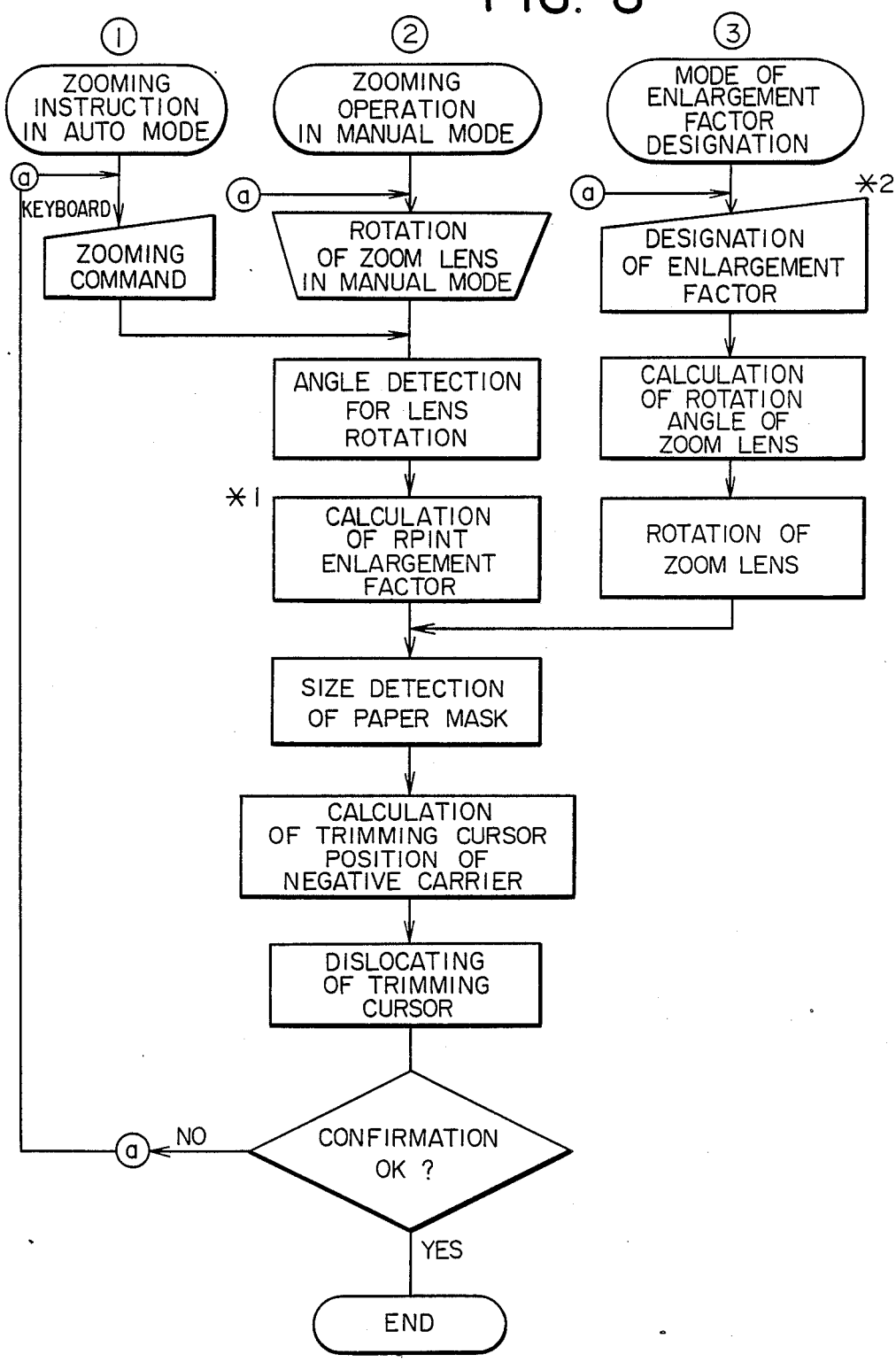
FIG. 8 is a flow chart of trimming processes.

In FIG. 8, 1 indicates zooming instruction in auto mode. The operator gives the instruction of magnification change to the printer through the keyboard. It activates the rotation of the zoom lens, and the magnification change is calculated according to the rotational amount of the lens. The trimming frame movement is determined depending on the paper mask size and the calculated magnification factor.

The operator observes the negative frame on the negative mask, and cancels the instruction of magnification change if the trimming frame has moved up to the predetermined trimming area.

The zooming operation in manual mode is shown as 2 in FIG. 8. The operator manually operates the zoom lens in stead of giving a magnification change instruction. Subsequent processes are the same as 1 in FIG. 8. As soon as the trimming frame piece reaches the target position, the operation of zoom lens rotation is interrupted.

In FIG. 8, 3 indicates the case where the magnification at the time of trimming is known in advance. The magnification value is input through the keyboard, and then the rotation angle of the zoom lens is calculated according to it, thus the zoom lens is rotated and the trimming frame piece is moved.

Figure 9:
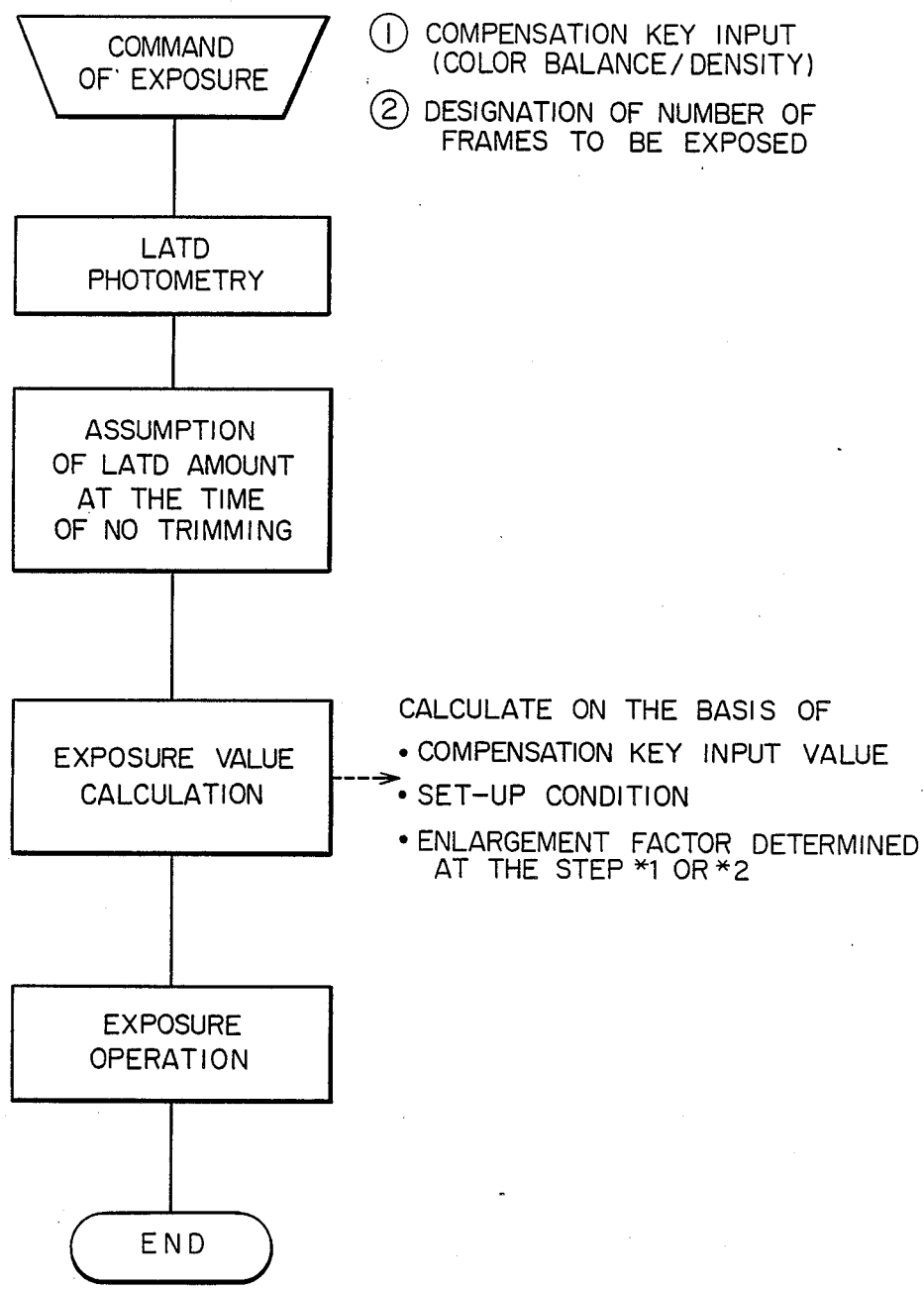
FIG. 9 is a flow chart which determines the value of LATD (latitude average transmission density).
Figure 10:
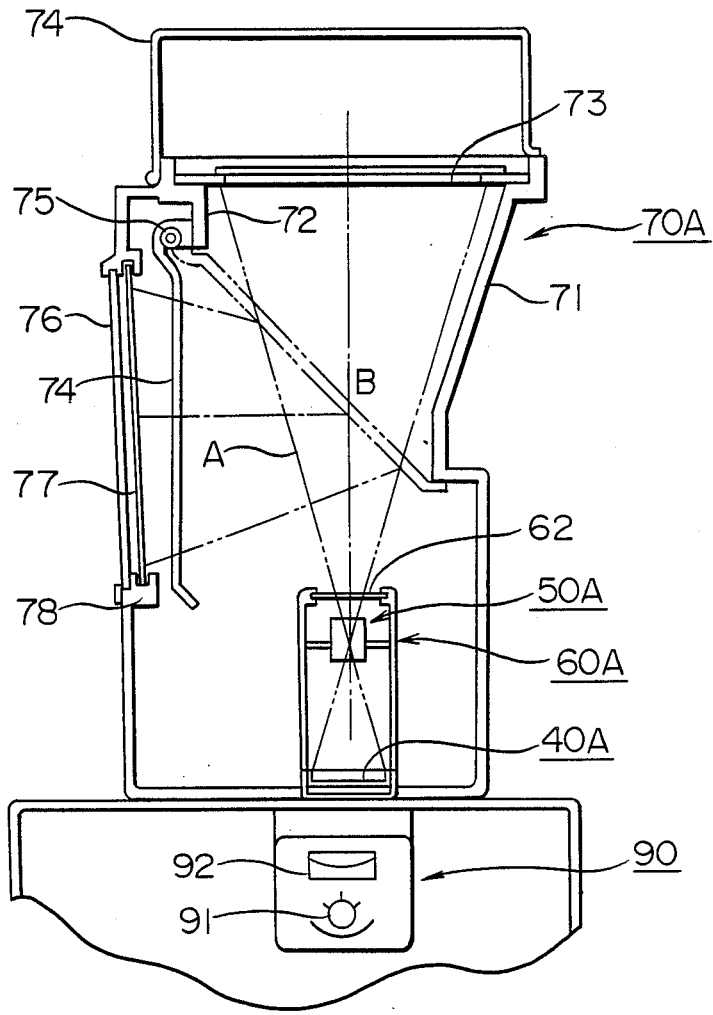
FIG. 10 is an outline illustration of a conventional printer incorporating a viewer function.
Figure 11:
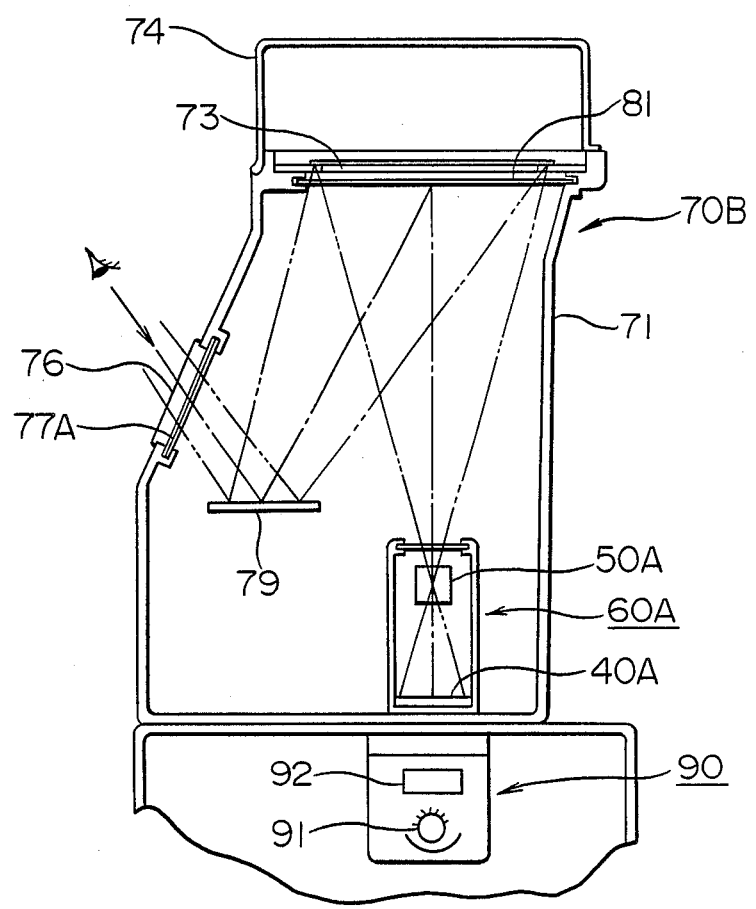
FIG. 11 is an illustration of a conventional printer with a different type of viewer function.

After finishing the trimming operation in any of the afore-mentioned three modes, the exposure processes proceed according to the flow chart shown in FIG. 9 by giving an exposure instruction.

The exposure calculation in the case of printing with trimming differs from that in the case of printing without trimming in the flowing points; virtual calculation of the LATD amount without trimming on the basis of the LATD amount with trimming, and the exposure volume calculation compensated according to the standard magnification volume without trimming obtained on the basis of the enlargement value.

The zoom lens control mechanism is as follows:

In this actual example, the objective was focused on the print size generally called "E-size" (E, L, 2L or a similar size). With the E-size print magnification of 3.70× and the 2L size print magnification of 5.62× in mind, the magnification change range of the zoom lens was determined as 3.26× ~8.83×. (Note: The magnification of an E-size BL (borderless) print is approx. 3.70×, but that of a WB (with border) print is nearly 3.3×.)

Although it is possible to cover the magnification of the zoom lens ranging from 3.26× through 8.83× with a single lens, three zoom lenses are used in combination in this invention because with the use of a single lens, an unacceptable quality deterioration, resolution and irregular calculation, is anticipated for the print image.

Figure 7:
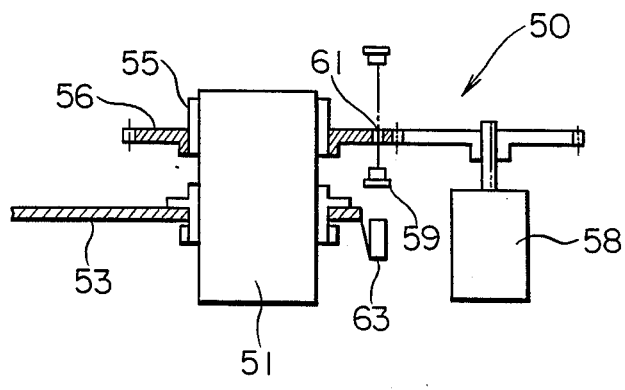
FIG. 7 is a drawing to show the mounting of the zoom lenses.

From the viewpoint of a more simplified control mechanism, the rotation angle of the zoom lens was limited between 0° and 90° for all three lenses. Furthermore, three sets of the zoom lenses, of which the mounting position had been adjusted in advance to match the lens board 53, and the lens board 53 were prepared in as a single unit, as indicated in FIG. 7. Also, each set was designed to be interchangeable for mounting: Thus, the absolute position at 0° or 90° takes the same angular position for the three lenses.

When the three zoom lenses are mounted to the printer main unit, the zoom lens type detection switch 63 confirms the type of the activated zoom lens, and at the same time the pulse motor 58 is rotated to the initial position of the zoom lens; the photoelectric switch 59 consisting of an LED and a photo transistor serves to detect the initial position identification hole 61 on the gear 56 fixed to the zoom ring 55.

The designation of the rotation angle of the zoom ring from its initial position is determined by the number of pulses given to the pulse motor 58. The relation between the zoom lens' rotation angle and the projection magnification had been previously calculated when the lens was designed. The calculation results for the three zoom lenses used in this invention are as shown in Table 4. The magnification value and angle data for each lens are inputted respectively beforehand in a memory in the printer unit.

TABLE 4

| Rotation angle | Magnification (X) | | | Rotation angle | Magnification (X) | | |
| --- | --- | --- | --- | --- | --- | --- | --- |
| | Zoom lens (1) | Zoom lens (2) | Zoom lens (3) | | Zoom lens (1) | Zoom lens (2) | Zoom lens (3) |
| 0° | 4.86 | 6.47 | 8.83 | 50° | 3.93 | 5.23 | 7.14 |
| 1° | 4.84 | ↑ | ↑ | 51° | 3.91 | ↑ | ↑ |
| 2° | 4.82 | ↑ | ↑ | 52° | 3.90 | ↑ | ↑ |
| 3° | 4.80 | ↓ | ↓ | 53° | 3.88 | ↓ | ↓ |
| 4° | 4.78 | ↓ | ↓ | 54° | 3.86 | ↓ | ↓ |
| 5° | 4.76 | 6.34 | 8.66 | 55° | 3.84 | 5.12 | 6.98 |
| 6° | 4.74 | ↑ | ↑ | 56° | 3.83 | ↑ | ↑ |
| 7° | 4.73 | ↑ | ↑ | 57° | 3.81 | ↑ | ↑ |
| 8° | 4.71 | ↓ | ↓ | 58° | 3.79 | ↓ | ↓ |
| 9° | 4.69 | ↓ | ↓ | 59° | 3.78 | ↓ | ↓ |
| 10° | 4.67 | 6.21 | 8.48 | 60° | 3.76 | 5.00 | 6.83 |
| 11° | 4.65 | ↑ | ↑ | 61° | 3.74 | ↑ | ↑ |
| 12° | 4.63 | ↑ | ↑ | 62° | 3.72 | ↑ | ↑ |

TABLE 4-continued

| | Magnification (X) | | | | Magnification (X) | | |
|---|---|---|---|---|---|---|---|
| Rotation angle | Zoom lens (1) | Zoom lens (2) | Zoom lens (3) | Rotation angle | Zoom lens (1) | Zoom lens (2) | Zoom lens (3) |
| 13° | 4.61 | ↓ | ↓ | 63° | 3.71 | ↓ | ↓ |
| 14° | 4.59 | ↓ | ↓ | 64° | 3.69 | ↓ | ↓ |
| 15° | 4.57 | 6.08 | 8.31 | 65° | 3.67 | 4.89 | 6.68 |
| 16° | 4.55 | ↑ | ↑ | 66° | 3.66 | ↑ | ↑ |
| 17° | 4.53 | ↑ | ↑ | 67° | 3.64 | ↑ | ↑ |
| 18° | 4.51 | ↓ | ↓ | 68° | 3.62 | ↓ | ↓ |
| 19° | 4.50 | ↓ | ↓ | 69° | 3.61 | ↓ | ↓ |
| 20° | 4.48 | 5.96 | 8.14 | 70° | 3.59 | 4.78 | 6.52 |
| 21° | 4.46 | ↑ | ↑ | 71° | 3.57 | ↑ | ↑ |
| 22° | 4.44 | ↑ | ↑ | 72° | 3.56 | ↑ | ↑ |
| 23° | 4.42 | ↓ | ↓ | 73° | 3.54 | ↓ | ↓ |
| 24° | 4.40 | ↓ | ↓ | 74° | 3.52 | ↓ | ↓ |
| 25° | 4.38 | 5.83 | 7.96 | 75° | 3.51 | 4.66 | 6.37 |
| 26° | 4.36 | ↑ | ↑ | 76° | 3.41 | ↑ | ↑ |
| 27° | 4.35 | ↑ | ↑ | 77° | 3.47 | ↑ | ↑ |
| 28° | 4.33 | ↓ | ↓ | 78° | 3.46 | ↓ | ↓ |
| 29° | 4.31 | ↓ | ↓ | 79° | 3.44 | ↓ | ↓ |
| 30° | 4.29 | 5.71 | 7.79 | 80° | 3.42 | 4.56 | 6.22 |
| 31° | 4.27 | ↑ | ↑ | 81° | 3.41 | ↑ | ↑ |
| 32° | 4.26 | ↑ | ↑ | 82° | 3.39 | ↑ | ↑ |
| 33° | 4.24 | ↓ | ↓ | 83° | 3.38 | ↓ | ↓ |
| 34° | 4.22 | ↓ | ↓ | 84° | 3.36 | ↓ | ↓ |
| 35° | 4.20 | 5.59 | 7.63 | 85° | 3.34 | 4.45 | 6.48 |
| 36° | 4.18 | ↑ | ↑ | 86° | 3.33 | ↑ | ↑ |
| 37° | 4.16 | ↑ | ↑ | 87° | 3.31 | ↑ | ↑ |
| 38° | 4.15 | ↓ | ↓ | 88° | 3.30 | ↓ | ↓ |
| 39° | 4.13 | ↓ | ↓ | 89° | 3.28 | ↓ | ↓ |
| 40° | 4.11 | 5.47 | 7.47 | 90° | 3.26 | 4.34 | 5.93 |
| 41° | 4.09 | ↑ | ↑ | | | | |
| 42° | 4.07 | ↑ | ↑ | | | | |
| 43° | 4.06 | ↓ | ↓ | | | | |
| 44° | 4.04 | ↓ | ↓ | | | | |
| 45° | 4.02 | 5.35 | 7.30 | | | | |
| 46° | 4.00 | | | | | | |
| 47° | 3.98 | | | | | | |

This invention allows a photographic printer with a high-speed, mass-printing ability to additionally incorporate a sophisticated, effective print trimming function even on E-size prints for which only printing without trimming orders have been so far accepted by photo labs. In other words, it has succeeded in putting an easy trimming operation to practical use in the field of E-size prints as well, which enables selection of a variety of compositions, easily and conveniently from a 135 negative frame.

What is claimed is:

1. A trimming device for use with a photographic printer comprising;
 a fixed window means being unchangeable in size;
 a variable window means having a movable window frame for changing a window size thereof;
 each of said fixed window means and variable window means being symmetrically shaped in the optical axis of exposure light so that exposure light is projected through the smaller of said fixed window means and said variable window means;
 a film guide means for guiding a film frame to be printed into said exposure light, said film guide means being adapted to allow a film frame to move in an X- direction corresponding to the lengthwise direction of said film and in a Y- direction corresponding to a widthwise direction of said film;
 said movable window frame member having trimming frames movable in the X and Y direction adapted to change a window size in both the X and Y directions symmetrically in the optical axis of said exposure light, a trimming area determined by said movable window frame being regulated to become relatively similar for printing paper areas different in printing size;
 wherein each printing area different in printing size has a basic magnification predetermined with respect to the fixed window of said fixed window means, and
 wherein, when a trimming magnification is larger than a basic magnification of a printing area to be exposed, said trimming area is adjusted to have dimensions obtained by dividing the dimensions of the printing area in the X and Y direction by the trimming magnification, and when the trimming magnification is smaller than the basic magnification, said trimming area is adjusted to have dimensions not less than the dimensions of the fixed window.

2. The device claimed in claim 1,
 wherein said film guide is a plate member having a fixed window which is movable in Y direction with said film frame, and said film frame is movable in X direction with respect to said fixed window means on said plate member.

3. A trimming device for use with a photographic printer comprising;
 a fixed window means being unchangeable in size;
 a variable window means having a movable window frame for changing a window size thereof;
 each of said fixed window means and variable window means being symmetrically shaped in the optical axis of exposure light so that exposure light is projected through the smaller of said fixed window means and said variable window means;

a film guide means for guiding a film frame to be printed into said exposure light, said film guide means being adapted to allow a film frame to move in an X- direction corresponding to the lengthwise direction of said film and in a Y- direction corresponding to a widthwise direction of said film;

said movable window frame members being adapted to change a window size in both the X and Y directions symmetrically in the optical direction of said exposure light;

wherein printing areas of different sizes have a basic magnification predetermined with respect to the fixed window of said fixed window means, and wherein, when a trimming magnification is larger than the basic magnification of a printing area to be exposed, said trimming area is adjusted to have dimensions obtained by dividing the dimensions of the printing area in the X and Y direction by the trimming magnification, and when the trimming magnification is smaller than the basic magnification, said trimming area is adjusted to have dimensions not less than the dimensions of the fixed window.

4. The device claimed in claim 3, wherein large area transmission density (LATD) of said trimming area is measured so that the LATD of said trimming area in case of without trimming is calculated according to the area ratio of said trimming area against a fixed window area in case of without trimming, thus an exposure calculation for printing is enforced by a comparison between the LATD in case of without trimming and a standard LATD.

5. The device claimed in claim 3, wherein a magnification of print is changed by a zoom lens rotating a lens barrel ring.

6. The device claimed in claim 3, wherein a magnification of print is changed by a varifocal lens rotating a lens barrel ring and moving the position of said varifocal lens.

7. The device claimed in claim 3, wherein a magnification of print is changed by varing the distance between a fixed focus lens and said negative frame, or the distance between said fixed focus lens and said printing paper area.

8. The device of claim 3 wherein said movable window frame member has trimming frames which are movable in the X and Y direction.

9. A trimming device for use with a photographic printer comprising:

a fixed window means being unchangeable in size;

a variable window means having a movable window frame for changing a window size thereof;

each of said fixed window means and variable window means being symmetrically shaped in the optical axis of exposure light so that exposure light is projected through the smaller of said fixed window means and said variable window means;

a film guide means for guiding a film frame to be printed into said exposure light, said film guide means being adapted to allow a film frame to move in an X- direction corresponding to the lengthwise direction of said film and in a Y- direction corresponding to a widthwise direction of said film;

said movable window frame member having trimming frames movable in the X and Y direction adapted to change a window size in both the X and Y directions symmetrically in the opticaly axis of said exposure light, wherein a trimming area determined by said trimming frames in said film frame is automatically set to a predetermined size by inputting a magnification ratio with a magnification ratio input means so that said trimming frames of said variable window means move to the positions for said predetermined size according to said magnification ratio and a predetermined printing image size.

10. The device claimed in claim 9, wherein a trimming area determined by said trimming frames is automatically, reset to an another predetermined size from said predetermined size by inputting an another magnification ratio with said magnification ratio input means so that said trimming frames of said variable window means move to the positions for said another predetermined size according to said another magnification ratio and said predetermined printing image size.

11. The device claimed in claim 9, wherein a trimming area determined by said trimming frames is manually set to an expecting size by manually changing magnification ratio so that said trimming frames of said variable window means move to the positions for said expecting size according to a magnification ratio for said expecting size and said predetermined printing image size.

* * * * *